Aug. 10, 1954     H. P. ROOKSBY     2,686,274
THERMIONIC CATHODE
Filed May 11, 1950
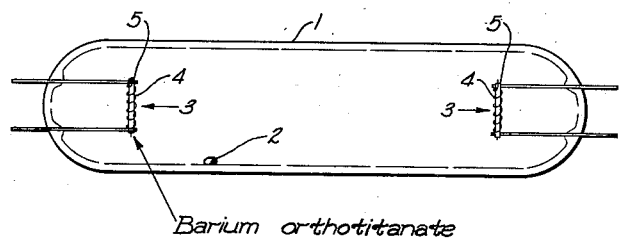
Inventor:
Harold P. Rooksby,
by Vernet C. Kauffman
His Attorney.

Patented Aug. 10, 1954

2,686,274

UNITED STATES PATENT OFFICE 2,686,274

THERMIONIC CATHODE

Harold Percy Rooksby, Harrow, England, assignor to General Electric Company, a corporation of New York Application May 11, 1950, Serial No. 161,353

Claims priority, application Great Britain May 20, 1949

2 Claims. (Cl. 313—212)

This invention relates to thermionic cathodes of the activated type, that is to say, of the type comprising electron-emissive activating material supported by the metal parts of the cathode. More particularly, the invention is concerned with the electron-emissive material used in such cathodes.

Cathodes of this type are employed in many kinds of electric discharge devices. One form of such a cathode, for example, comprises a perforated metal container and within the container a rod of electron-emissive material. This form of cathode is often used, for example, for the electrodes of electric discharge lamps, and in this case the perforated metal container is usually a helix of tungsten wire and the rod of electron-emissive material is arranged to be heated by the passage of electric current through the helix. Other forms of cathode, for example, in which the electron-emissive material is in granular form or in the form of a coating on a metal surface, may also be used.

The electron-emissive materials hitherto generally used in cathodes of this type have been oxides or silicates of the alkaline earth metals. It has also been proposed to use barium thorate for this purpose: thus the manufacture of rods of electron-emissive material comprising barium thorate with or without the addition of calcium and/or strontium is described in British patent specification No. 577,599 (U. S. Patent 2,394,095, S. H. Noble et al.), while the manufacture of rods of similar material containing also molybdenum and/or tungsten is described in British patent specification No 594,059.

We have now found that barium titanate may be used as a main constituent in electron-emissive materials for thermionic cathodes, and that cathodes in which barium titanate is thus employed have useful properties with regard to emissive power and length of life. Barium titanate has the additional advantage of being highly refractory, that is, it has a high melting point and is stable at high temperatures. These properties are particularly desirable in the electron-emissive rods employed in the electrodes of high pressure metal vapor discharge lamps.

According to the present invention, therefore, in a thermionic cathode of the activated type the electron-emissive material consists wholly or mainly of barium titanate, more particularly in the form of the orthotitanate.

A minor proportion of a second alkaline earth metal, particularly of strontium, may, if desired, be included in the said material. Thus strontium may be present as strontium titanate, which forms a solid solution with the barium titanate, so that when the material contains a minor proportion of strontium the orthotitanate compound, for example, may be regarded as possessing the molecular formula $(Ba, Sr)_2TiO_4$.

Barium orthotitanate may be produced by heating an intimate mixture of titanium dioxide and a suitable barium compound, such as barium carbonate or barium peroxide, in the appropriate proportions to give a compound of the formula $Ba_2TiO_4$, that is to say, in the molecular proportions $BaCO_3:TiO_2=2:1$ or $BaO_2:TiO_2=2:1$. If strontium is to be incorporated in the material, a mixture of barium and strontium compounds, for example barium carbonate and strontium carbonate, may be heated with an appropriate amount of titanium dioxide.

When the barium titanate material is to be employed in electrodes of the type comprising a rod of the electron-emissive material supported in a perforated container, the material may be prepared in the form of rods of the appropriate size.

The preferred method of manufacturing such rods of electron-emissive material for electrodes in accordance with the invention comprises forming a mixture of which the major constituents are barium carbonate and titanium dioxide, in the appropriate proportions, with a suitable binder, extruding this mixture to form a rod and heating the rod in a non-oxidizing atmosphere to a temperature and for a time such that the barium carbonate and titanium dioxide react together to produce barium orthotitanate. If desired, a minor proportion of the barium carbonate may be substituted by strontium carbonate.

The heating may be effected at temperatures over a wide range above 900° C., but temperatures considerably above 900° C. are preferred in order to obtain rods of the desired high density and mechanical strength, temperatures of about 1400° to 1500° C. being suitable.

Two methods of manufacturing rods of electron-emissive material for thermionic cathodes in accordance with the invention will now be described by way of example.

In the first method, barium carbonate and titanium dioxide in the molecular proportions $BaCO_3:TiO_2=2:1$ are mixed together with a quantity of a suitable binder, such as gum tragacanth, and the mixture is extruded through a suitable die in the form of rods. These rods are placed on magnesia trays in molybdenum boats, and the boats are passed through a furnace maintained at 1400° C. and containing an atmosphere of hydrogen, the speed at which the boats travel through the furnace being so arranged that the rods attain the temperature of 1400° C. in 7 minutes and are maintained at that temperature for 10 minutes. The rods are then cooled down to room temperature, in hydrogen, in a further period of 10 minutes.

The second method is a modification of the first in that the rods are formed from a mixture of barium carbonate, strontium carbonate and titanium dioxide in the molecular proportions $BaCO_3:SrCO_3:TiO_2=3:1:2$, with a binder such as gum tragacanth.

The invention also includes within its scope electric discharge devices having one or more activated thermionic cathodes incorporating barium titanate-containing material as described and especially electric discharge lamps (in particular high pressure metal vapor electric discharge lamps) having one or more electrodes in the form of a helix of a refractory wire, such as tungsten, enclosing a rod of the barium titanate-containing material.

The drawing is an elevation of an electric discharge lamp containing activated electrodes in accordance with the invention.

Referring to the drawing, the lamp shown therein may be of the high pressure mercury vapor type as exemplified generally by Patents 2,202,199—Germer, 2,094,694—Bol et al. and 2,009,211—St. Louis. The lamp comprises an envelope 1 of vitreous material containing an ionizable gaseous atmosphere including a gas such as argon and a quantity of vaporizable metal 2, preferably mercury which, during operation, attains a discharge-constricting pressure of, for example, about an atmosphere or many atmospheres. Sealed in each end of the envelope is an electrode 3 containing activating barium orthotitanate in accordance with the invention. The electrodes 3 are herein illustrated, by way of example only, as the type comprising a helix 4 of refractory wire, like tungsten, enclosing a rod 5 of the barium orthotitanate.

Measurements show that the emissivity of barium orthotitanate is greater than that of the thorate, nickelate, aluminate, silicate, or zirconate. Furthermore, I have found that there is an unexpected and disproportionate improvement in the orthotitanate as compared with the metatitanate, the emissivity of barium orthotitanate being about five times greater than that of the metatitanate and being greater under the conditions prevailing in a discharge lamp than in a vacuum tube.

What I claim as new and desire to secure by Letters Patent of the United States is:

1. A gaseous electric discharge lamp comprising a sealed envelope containing a gaseous ionizable atmosphere and cooperating electrodes at least one of which is an electron-emissive cathode comprising a refractory metal base and a quantity of activating barium orthotitanate supported by said base.

2. A gaseous electric discharge lamp comprising a sealed envelope containing a gaseous ionizable atmosphere and cooperating electrodes at least one of which is an electron-emissive cathode comprising a refractory metal base and a quantity of activating barium and strontium orthotitanate supported by said base.

References Cited in the file of this patent

UNITED STATES PATENTS

| Number | Name | Date |
|---|---|---|
| 1,762,581 | Nicolson | June 10, 1930 |
| 2,166,221 | Patterson | July 18, 1939 |
| 2,477,279 | Anderson | July 26, 1949 |